United States Patent [19]

Parma

[11] Patent Number: 4,529,421
[45] Date of Patent: Jul. 16, 1985

[54] APPARATUS FOR REDUCING CONTAMINANTS IN GAS CONTAINING PRODUCTS OF COMBUSTION

[76] Inventor: John Parma, 6749 Lincoln Green Rd., Holland, Ohio 43528

[21] Appl. No.: 602,067

[22] Filed: Apr. 19, 1984

[51] Int. Cl.³ .............................................. B01D 47/06
[52] U.S. Cl. ........................................ 55/228; 55/229; 55/DIG. 30; 55/435; 261/22; 261/126; 261/DIG. 9; 261/17
[58] Field of Search .................. 261/126, DIG. 9, 22, 261/17; 55/DIG. 30, 228, 229, 435

[56] References Cited

U.S. PATENT DOCUMENTS

| | | | |
|---|---|---|---|
| 679,666 | 7/1901 | Clawson | 261/126 |
| 1,620,826 | 3/1927 | Mitchell | 261/22 |
| 1,637,516 | 8/1927 | Brilliant | 55/DIG. 30 |
| 1,948,348 | 2/1934 | Gerhold | 261/126 |
| 2,184,185 | 12/1939 | Gerhold | 261/126 |
| 2,653,674 | 9/1953 | Ortgies | 261/126 |
| 2,787,119 | 4/1957 | Giambruno | 55/DIG. 30 |
| 2,936,844 | 5/1960 | Gill | 55/DIG. 30 |
| 3,282,047 | 11/1966 | Wertheimer | 55/DIG. 30 |
| 3,353,335 | 11/1967 | Caballero | 55/DIG. 30 |
| 3,605,386 | 9/1971 | Erwin et al. | 261/126 |
| 3,621,652 | 11/1971 | Demaree | 55/DIG. 30 |
| 3,733,788 | 5/1973 | Crowley | 261/116 |
| 3,742,682 | 7/1973 | Ligutom | 55/DIG. 30 |
| 3,957,467 | 5/1976 | Kim | 55/DIG. 30 |
| 4,008,056 | 2/1977 | Potter | 261/126 |

FOREIGN PATENT DOCUMENTS

| | | | |
|---|---|---|---|
| 556796 | 5/1957 | Belgium | 261/126 |
| 804696 | 4/1951 | Fed. Rep. of Germany | 261/22 |
| 186766 | 10/1922 | United Kingdom | 261/126 |

*Primary Examiner*—Tim Miles
*Attorney, Agent, or Firm*—Allen D. Gutchess, Jr.

[57] ABSTRACT

Apparatus is provided for reducing contaminants in gases containing products of combustion. The apparatus is particularly advantageous for reducing airborne sulfur in smoke from burning coal. This enables more use of coal, including high sulfur coal, without the concomitant problem of acid rain. The apparatus includes a duct or stack forming a first passage for directing the gases away from the source of combustion. A second duct forms a second, horizontal passage through which the gases flow from the first passage. A spray head is located at an upper portion of the second passage to direct a spray of water across the passage and into contact with the gases. A drain is located in a lower portion of the second passage to collect the water and contaminants trapped therein from the gases. The water can be cleaned and reused. The apparatus can also be employed with an internal combustion engine to reduce contaminants in the exhaust gases.

2 Claims, 4 Drawing Figures

APPARATUS FOR REDUCING CONTAMINANTS IN GAS CONTAINING PRODUCTS OF COMBUSTION

This invention relates to apparatus for reducing contaminants in gases which contain products of combustion.

The invention is particularly advantageous for use in industries burning coal as fuel, or desiring to burn coal. However, it can also be used in connection with internal combustion engines as used in vehicles to reduce the contaminants in the exhaust gases.

Coal is desirable for use as an industrial fuel because of the vast quantities of reserves and because of the present relative economic advantages over other fuels. High sulfur coal is particularly advantageous for fuel in areas such as Ohio, where the high sulfur coal is abundant and transportation costs to nearby industries and utilities are lower than for more remotely-located hard coal which generally contains less sulfur. However, the problem of acid rain attributed to the use of coal, particularly high sulfur coal, as fuel is now well known and has inhibited the use of coal and has caused or will cause some coal burning facilities to revert to oil or gas as fuel.

The present invention is intended to remove substantially all contaminants, particularly in the nature of sulfur, from gases containing products of combustion, and particularly coal smoke, to substantially eliminate the problem of acid rain and other problems associated with airborne pollutants. The apparatus includes a duct or stack forming a first passage for directing the gases away from the source of combustion. A second duct or the like forms a second, generally horizontal passage through which the gases then flow. A spray head can be located at an upper portion of the second passage to direct a spray of water across the second passage, transversely to the direction of gas flow, to remove the airborne contaminants in the gases. A drain is located in a lower portion of the second passage to collect the water and contaminants therein. The water can then be cleaned and recirculated. When the contaminants are lighter than the water, they can be removed by a weir located near the top of the container in which the water is drained. Filters can also be used to filter the contaminants before the water is pumped back to the spray head. The apparatus can be used to modify existing smokestacks. It can also be used with new smokestacks.

The invention can also be used with a modified vehicle muffler. Spray heads are then located along an upper portion of the muffler to spray water transversely to the exhaust gases and the water can be collected by a drain trough in the bottom of the muffler. This water than can be returned to a container in the vehicle, cleaned, and pumped back to the muffler spray heads.

It is, therefore, a principal object of the invention to reduce contaminants in gases containing products of combustion.

Another object of the invention is to provide apparatus for removing contaminants from coal smoke to reduce the problem of acid rain.

Many other objects and advantages of the invention will be apparent from the following detailed description of preferred embodiments thereof, reference being made to the accompanying drawings, in which.

Figure 1:
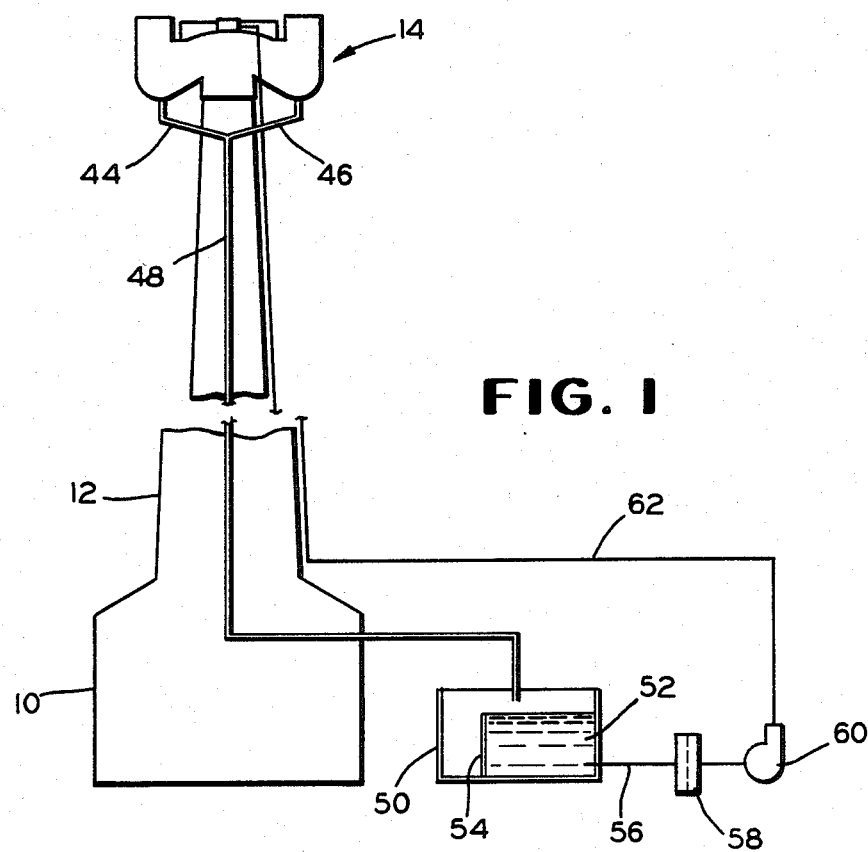
FIG. 1 is a somewhat schematic view in elevation of a coal-burning facility, an existing smokestack, and contaminant-reducing apparatus in accordance with the invention.

Referring to FIG. 1, a coal-burning facility indicated at 10 is in the form of a furnace boiler, or the like and has a smokestack 12 extending upwardly therefrom, the stack being of the usual refractory and brick construction. A contaminant-reducing unit 14 can be retrofitted on the discharge end of the smokestack 12 which forms a first main passage 16 (FIG. 2) for directing gases containing combustion products away from the boiler 10.

The contaminant-reducing unit 14 includes a fabricated metal housing 18 forming second and third passages 20 and 22 which extend transversely to the main passage 16. The housing 18 has a mounting collar 24 which fits on the top of the smokestack 12 and is suitably affixed thereto. Suitable bracing can also be added, if required. The housing 18 also forms fourth and fifth passages 26 and 28 extending upwardly, transversely to the second and third passages 20 and 22. Blowers or fans 30 can be mounted in the passages 26 and 28, if desired, to maintain flow of gases through the passages.

Figure 2:
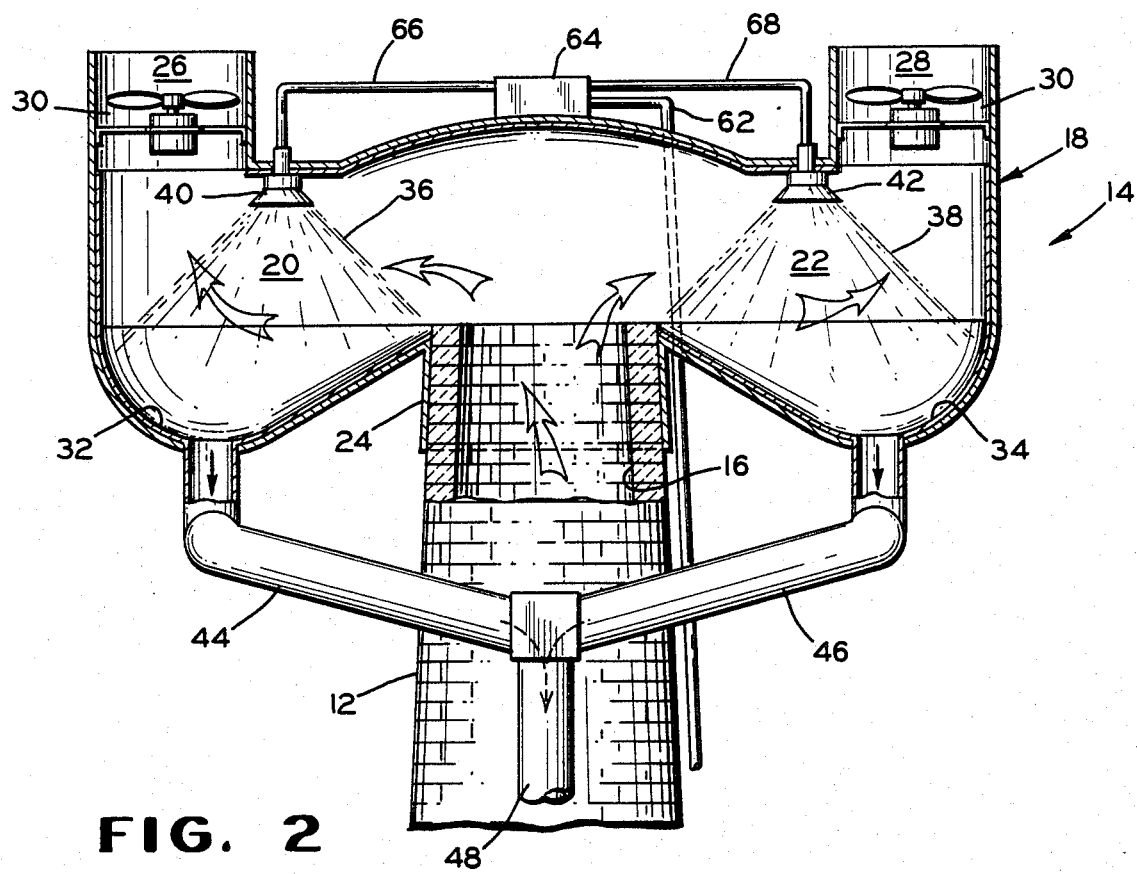
FIG. 2 is an enlarged, somewhat schematic, fragmentary view in section of an upper portion of the smokestack and the contaminant-reducing apparatus of FIG. 1.

Drain recesses 32 and 34 are formed in lower portions of the passages 20 and 22 to receive water from sprays 36 and 38 emanating from spray heads 40 and 42 located in upper portions of the passages 20 and 22. Rather than the diametrical opposite transverse passages 20 and 22, the housing 18 can form a single circular transverse passage extending radially outwardly in all directions from the passage 16 with a ring of spray heads therein. The water, along with sulfur, usually in the form of sulfur dioxide, and other contaminants in the gases containing combustion products flowing through the passages, are collected in the drain recesses 32 and 34 and flow downwardly through branch drain lines 44 and 46. Because of the acidic nature of the water containing the sulfur, the housing 18 has the transverse passage areas thereof lined with stainless steel, as shown in FIG. 2. The branch lines 44 and 46 communicate with a main drain line 48 which directs the water and contaminants downwardly to a container 50 (FIG. 1). The water and contaminants are collected in the container 50 in a body or pool 52 on one side of a weir or dam 54. Contaminants which are lighter than the water can flow over the weir 54 and be subsequently removed from the container 50 from time-to-time.

Water and heavier contaminants can be pumped through a line 56 to a filter housing 58 in which the contaminants are removed. The cleaned water is then supplied by a pump 60 through a supply line 62 to a manifold 64 at the top of the unit 14. This water is than supplied through branch supply lines 66 and 68 to the spray heads 40 and 42 where it is again emitted in fine streams or droplets in the form of the sprays 36 and 38.

With the substantial removal of sulfur and other contaminants from the gases containing the products of combustion, coal, even high-sulfur coal, can be burned in the furnace 10 with acid rain and other problems caused by pollutants being substantially eliminated. This enables wider spread use of coal as an industrial fuel. This is particularly advantageous in view of the vast quantities of known coal reverses and also because of the present lower cost of coal over other fuels. The use of high-sulfur coal is particularly beneficial in areas such as the state of Ohio, where high-sulfur coal is particularly abundant. Transportation costs for such coal to nearby Ohio industries and utilities are also significantly lower than for more remotely-located hard coal.

Figure 3:
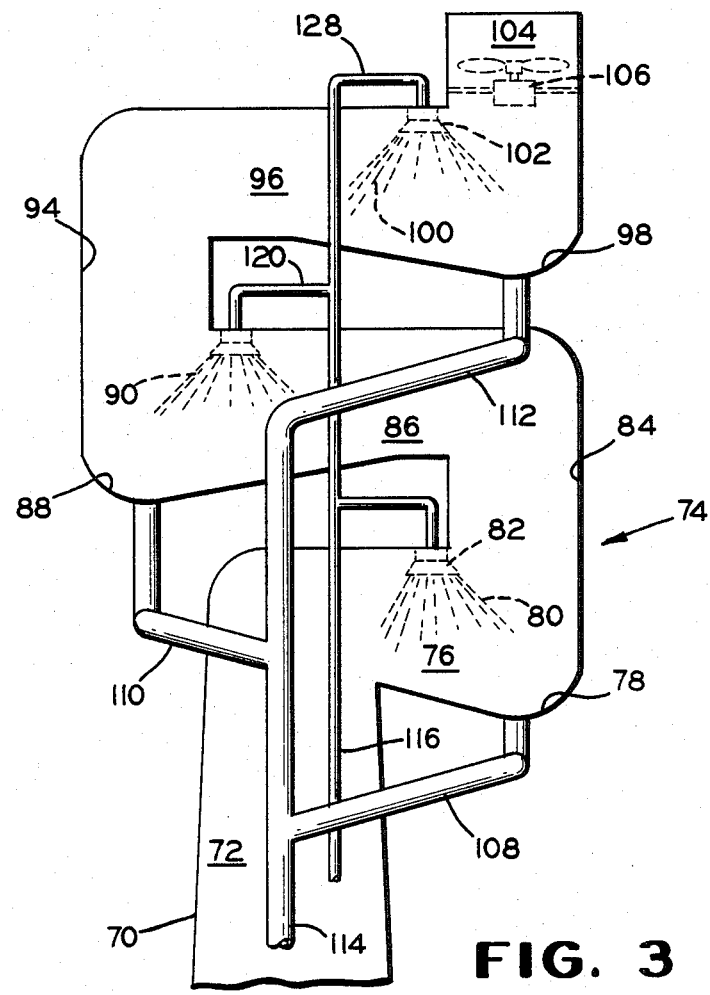
FIG. 3 is a schematic view in section of a portion of a new smokestack and modified contaminant-reducing apparatus.

FIG. 3 schematically shows a portion of a new smokestack and modified contaminant-reducing apparatus. An upper portion of a new smokestack 70 forms a main passage 72 for directing gases containing products of combustion away from a furnace or boiler, particularly one in which coal is burned as fuel. A contaminant-reducing unit 74 forms a first transverse passage 76 communicating with the main passage 72. A drain recess 78 is located at a lower portion of the passage 76 to collect water from a spray 80 emanating from a spray head 82. The unit 74 forms a third passage 84 communicating with the transverse passage 76 and extending upwardly therefrom. A fourth, transverse passage 86 extends transversely to the passage 84 and communicates therewith. A drain recess 88 is formed in the lower portion of the passage 86 to collect water from a spray 90 emanating from spray head 92. A fifth passage 94 extends transversely to the passage 86 and upwardly therefrom. A sixth passage 96 communicates with the passage 94 and is parallel with the passages 86 and 76, in this instance. The passage 96 has a drain recess 98 collecting water from a spray 100 emanating from a spray head 102. Finally, a seventh passage 104 extends transversely from the passage 96 and communicates therewith. A blower or fan 106 can be located in the passage 104 to enhance flow of gases through the passages. Additional passages with spray means can be employed, if desired, to further reduce the pollutants in the exhaust gases containing combustion products.

Branch drain lines 108, 110 and 112 connect the drain recesses 78, 88 and 98 with a main drain line 114. This can direct water and pollutants to a container similar to the container 50. A main water supply line 116 can similarly connect a source of water such as the pump 60 of FIG. 1 to branch supply lines 118, 120 and 122 for the spray heads 82, 92 and 102. At least those portions of the contaminant-reducing apparatus 74 which form the passage 76, 86 and 96 are lined with stainless steel to resist corrosion and rust, to endure heat, and to prevent possible warping.

Figure 4:
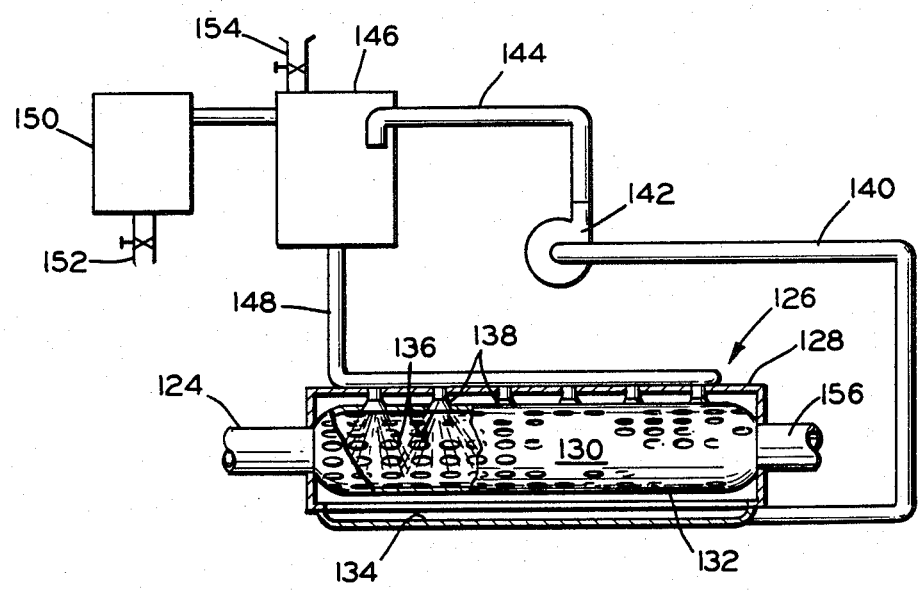
FIG. 4 is a schematic view of contaminant-reducing apparatus used in connection with a vehicle muffler.

FIG. 4 schematically shows the contaminant-reducing apparatus suitable for use with an internal combustion engine. An exhaust pipe 124 forms a main passage which communicates with an internal combustion engine in which organic fuel is burned and directs gases containing products of combustion away from the engine. A gas-contaminant reducing unit 126, in the form of a modified muffler, communicates with the main exhaust passage 124. The unit 126 includes a housing 128 forming a second passage 130. A perforate intermediate liner 132, primarily for noise reducing purposes, is located in the housing 128. A drain recess or trough is located in a lower portion of the housing 128 to receive water from sprays 136 emanating from spray heads 138. Water and contaminants from the drain trough 134 are returned through a return line 140 to a pump 142 through a line 144 to an enclosed container or tank 146. From here, the water is supplied through a supply line 148 to the spray heads 138. Contaminants from the water can be collected in a disposal tank 150 in which contaminants and some water can be periodically moved through a valve 152. Also, if desired, a filter can be located in any of the lines 140, 144 or 148. Make-up water can be periodically supplied through a supply line 154.

After the exhaust gases are cleaned and passed through the unit 126, they can be exhausted through a third passage formed by a pipe 156 to a resonator or tailpipe from which they are expelled to the atmosphere. The contaminant-reducing unit 126 and related components are made of stainless steel with the lines of the water circulating system being made of a high grade of rubber or the like.

Various modifications of the above-described embodiments of the invention will be apparent to those skilled in the art, and it is to be understood that such modifications can be made without departing from the scope of the invention, if they are within the spirit and the tenor of the accompanying claims.

I claim:

1. Apparatus for treating coal smoke containing sulfur, said apparatus comprising a smokestack of refractory and brick construction, said smokestack forming a first passage for delivery smoke away from a source of combustion, a metal housing having a mounting collar mounted on the upper end of said smokestack, said housing having stainless steel liners in those portions contacted by the smoke, said housing forming a second passage communicating with said first passage and extending transversely to said first passage, first spray means in an upper portion of said second passage for directing water in a spray transversely of said second passage, drain means in a lower portion of said second passage opposite said spray means for receiving and collecting water from said spray means, a drain line communicating with said drain means, said housing forming a third passage communicating with said first passage and extending transversely to said first passage, second spray means in an upper portion of said third passage for directing water in a spray transversely of said third passage, second drain means in a lower portion of said third passage opposite said second spray means for receiving and collecting water from said second spray means, a second drain line communicating with said second drain means, a water supply line communicating with said spray means, a water container for receiving water from said drain lines, said water container having a weir for removing sulfur and other light contaminants from the water, pump means for supplying water from said container to said water supply line, and a filter between said water container and said pump means for removing additional contaminants from the water.

2. Apparatus for treating gases containing combustion products comprising means forming a first passage for delivering the gasses away from the source of combustion, means forming a second passage communicating with an upper end of said first passage means, first spray means in an upper portion of said second passage means for directing water in a spray transversely of said second passage means, first drain means in a lower portion of said second passage means opposite said spray means for receiving and collecting water from said spray means, a drain line communicating with said drain means, third passage means extending upwardly transversely from an end of said second passage means, fourth passage means extending transversely from an upper end of said third passage means and being positioned above and generally parallel to said second passage means, second spray means in an upper portion of said fourth passage means for spraying water transversely across said fourth passage means, second drain means in a lower portion of said fourth passage means opposite said second spray means for receiving and collecting water from said second spray means, a second drain line communicating with said second drain means, fifth passage means extending upwardly transversely from an end of said fourth passage means, sixth passage means extending transversely from an upper end of said fifth passage means and being above and generally parallel to said second passage means and said fourth passage means, third spray means in an upper portion of said sixth passage means for spraying water transversely across said sixth passage means, third drain means in a lower portion of said sixth passage means opposite said third spray means for receiving and collecting water from said third spray means, a third drain line communicating with said third drain means, water supply lines communicating with said first, second and third spray means for supplying water thereto, a main drain line communicating with said first, second, and third drain lines, a water container for receiving water from said main drain line, said container having a weir over which contaminants which are lighter than the water can flow, a pump means for supplying water from said container to said water supply lines.

* * * * *

UNITED STATES PATENT OFFICE
CERTIFICATE OF CORRECTION

PATENT NO. : 4,529,421

DATED : July 16, 1985

INVENTOR(S) : John Parma

It is certified that error appears in the above–identified patent and that said Letters Patent are hereby corrected as shown below:

In the claims:

Claim 1, line 25, "delivery" should be --delivering--.

Signed and Sealed this

Eighth Day of October 1985

[SEAL]

Attest:

Attesting Officer

DONALD J. QUIGG

Commissioner of Patents and Trademarks—Designate